United States Patent [19]
Wittmann

[11] Patent Number: 5,289,079
[45] Date of Patent: Feb. 22, 1994

[54] COMPACT FLUORESCENT LAMP AND BASE COMBINATION, AND METHOD OF LAMP-BASE ASSEMBLY

[75] Inventor: Horst Wittmann, Stadtbergen, Fed. Rep. of Germany

[73] Assignee: Patent-Treuhand-Gesellschaft für elektrische Glühlampen mbH, Munich, Fed. Rep. of Germany

[21] Appl. No.: 685,547

[22] Filed: Apr. 15, 1991

[30] Foreign Application Priority Data

Apr. 20, 1990 [DE] Fed. Rep. of Germany ....... 4012684

[51] Int. Cl.⁵ ................................. H01J 5/50
[52] U.S. Cl. ..................... 313/318; 439/56; 439/226; 439/611; 315/58; 362/221; 362/226; 362/260
[58] Field of Search ........ 313/318, 493, 634; 439/56, 78, 235, 239, 226, 227, 228, 229, 230, 231, 232, 233, 234, 235, 236, 242, 243, 244, 345, 346, 611, 615, 616; 315/58, 56; 362/260, 265, 221, 216, 226; 361/408, 413

[56] References Cited

U.S. PATENT DOCUMENTS

| | | | |
|---|---|---|---|
| 3,233,207 | 2/1966 | Ahroni et al. | 439/611 |
| 4,695,767 | 9/1987 | Wittmann | 313/318 |
| 4,936,789 | 6/1990 | Ugalde | 439/232 |
| 5,018,992 | 5/1991 | Bergin et al. | 313/318 |
| 5,043,624 | 8/1991 | Hirozumi et al. | 313/318 |

FOREIGN PATENT DOCUMENTS 0179473 4/1986 European Pat. Off. .
0349083 1/1990 European Pat. Off. .
0179251 4/1986 Fed. Rep. of Germany .

*Primary Examiner*—Donald J. Yusko
*Assistant Examiner*—Michael Horabik
*Attorney, Agent, or Firm*—Frishauf, Holtz, Goodman & Woodward

[57] ABSTRACT

To simplify assembly of a bottom portion (4) with a cap portion (3) of a base to a compact fluorescent lamp, and permit automated assembly thereof, the cap portion is formed with inner axially extending projections (23-26), and current supply leads (27a-28b) are looped about the axially extending projections. A circuit board (8) located transversely across the bottom portion (4) has essentially U-shaped bow frames or arched or clip elements (35-38) located thereon which are positioned to engage by resilient surface contact with the end portions (31) of the current supply leads when the bottom portion and the cap portion are snapped together upon axial movement. Inwardly extending ribs (44, 45; 48, 49) projecting from the inner wall of the bottom portion support the bow frame or arched or clip elements, and ensure prestressed reliable contact engagement between the bow frame or arched or clip elements and the end portions of the current supply leads. Preferably, the end portions of the current supply leads and of the clip elements are made of tinned wires.

24 Claims, 4 Drawing Sheets

COMPACT FLUORESCENT LAMP AND BASE COMBINATION, AND METHOD OF LAMP-BASE ASSEMBLY

Reference to related literature: European Published Patent Application 0 179 251, by the inventor hereof, and assigned to the assignee of the present application.

FIELD OF THE INVENTION

The present invention relates to a compact fluorescent lamp and base combination, in which the base is of a standard type, for direct replacement of the compact fluorescent lamp with an incandescent lamp, and more particularly to a connection arrangement for contacting the electrode lead wires extending from the ends of the compact fluorescent lamp to circuit components such as ballasts and the like within the base.

BACKGROUND

Compact fluorescent lamps in which a discharge vessel is coupled to a base are rapidly replacing incandescent lamps due to the low energy use with respect to available light output. The compact fluorescent lamp is formed by a pair of interconnected tubular elements which are secured into a cap portion of the base. The base has a further bottom portion which retains a printed circuit board on which suitable circuit elements are located, forming ballasts and/or other circuit components to operate the compact fluorescent lamp directly from electrical supply mains. These direct replacement compact fluorescent lamps are expensive, and a substantial portion of the costs is due to the complex manufacturing steps required in their manufacture. One of these manufacturing steps is the electrical connection of the current supply leads from the discharge vessel to the respective connections of the ballast or accessory circuit. In incandescent lamps, two leads connect directly to the supplies from the base. In fluorescent lamps, however, two electrodes are located at both ends of the fluoroscent lamp, resulting in four leads, which have to be connected to a ballast or an accessory circuit which, in turn, is connected to the base terminals, for example a screw-in or "Edison" base. Connections for compact fluorescent lamps, as previously used, provided for crimping the supply leads from the discharge vessel to the connecting leads of the ballast by a metal clip or crimping the supply leads to contact pins in the cap which in turn can be so placed that upon assembly of the cap portion to the bottom portion of the base, the pins engage into counter terminals on the printed circuit board in the bottom portion. The referenced publication, by the inventor hereof, European Published Patent Application 0 179 251, describes such an arrangement. The current supply leads to the electrodes are connected electrically to the contact pins, by crimp or similar connection. This type of making contact while at the same time assembling the cap portion, in which the discharge vessel itself is already secured to the bottom portion is expensive since terminals must be secured in the cap and bottom portion.

THE INVENTION

It is an object to improve the overall construction of the lamp, including the construction of the base, so that the two base portions, that is, the cap with the discharge vessel thereon, and the bottom portion can be easily assembled by automatic machinery, while providing a secure electrical as well as mechanical engagement of terminals from the discharge vessel and terminal elements on the printed circuit board. The connection arrangement should be easy to make, inexpensive, and permit automatic manufacture as well as automatic assembly of the base.

Briefly, the cap portion of the base is formed with axially extending holding projections located adjacent the side walls, to which the leads or lead extensions from the electrodes of the compact fluorescent lamp are guided. These projections, preferably, are formed with guide notches about which the leads are bent, to wrap about the projections, so that an end portion of the respective electrode leads will extend in the direction of attaching movement between the bottom portion and the cap portion of the base, when assembled. The bottom portion of the base, with the printed circuit board located thereon, has frame elements located in the positions where the current supply lead extends. The frame elements are bowed U frames, or arched clips, having some resiliency and located so that the clips have a bowed or transverse engagement portion extending at roughly right angles to the bent-over portions of the electrode leads and located between the projection from the cap portion and the inner wall of the bottom portion, when the bottom and cap portions are pushed together. The arrangement provides for a secure electrical pinch connection between the electrode ends and the engagement portion of the bow frame, forming an arched element, or an arch clip.

The holding projections align the end portions of the electrode wires so that they can be engaged by the essentially transversely extending bow frames or arched elements secured to the printed circuit boards. Upon assembly, the wires to be contacted against each other are circumferentially aligned and then, when the base portion is axially, telescopically coupled to the cap portion, the bow frame and the end of the electrode wire will securely engage against each other. Initially, there will be a springy engagement and then, as the base portions are attached, the wires will be pressed against each other, for example by suitable locating ribs formed in the base portions. The base portions are made, for example, of plastic material.

DRAWINGS

DETAILED DESCRIPTION

Figure 1:
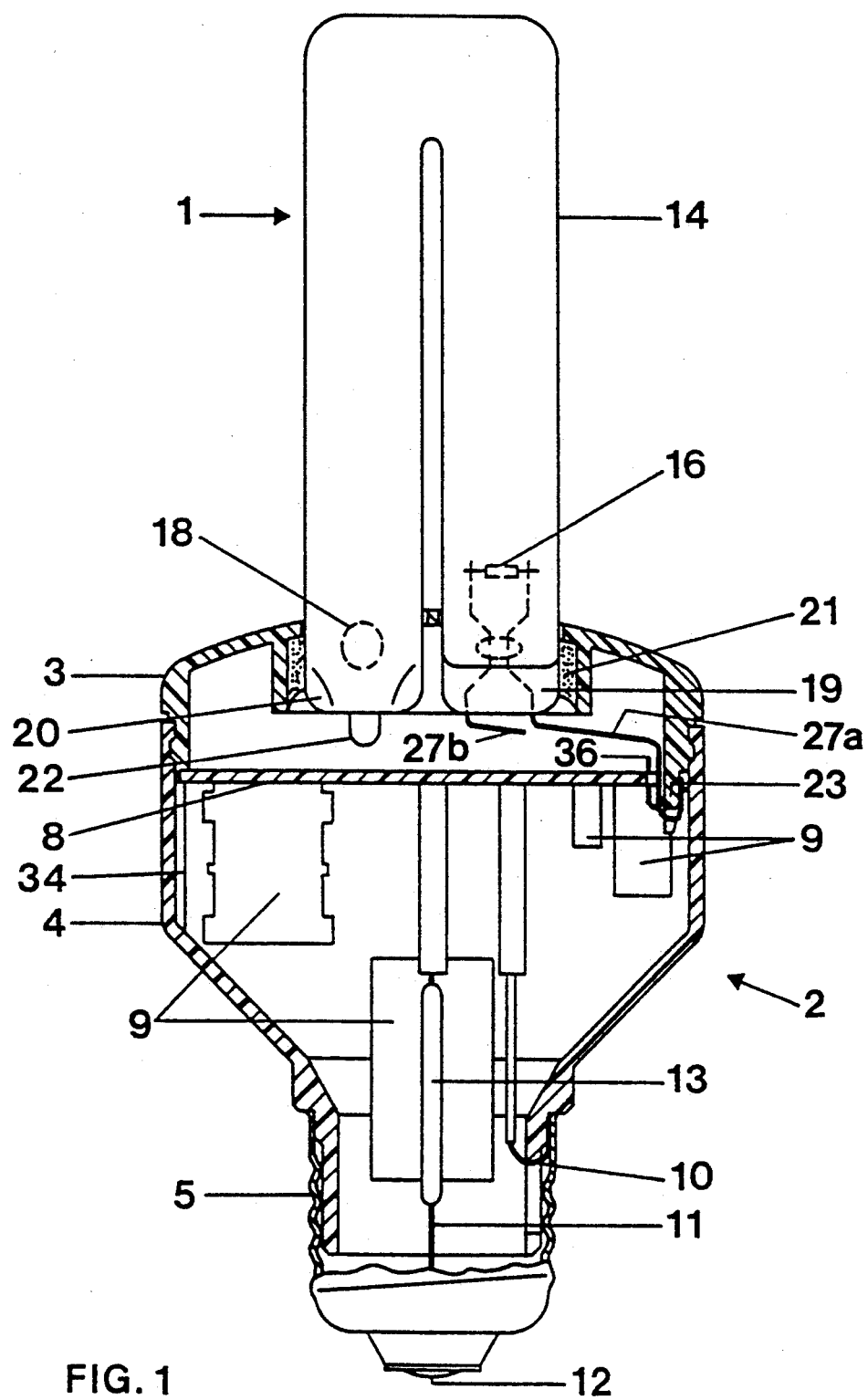
FIG. 1 is a highly schematic side view of a compact fluorescent lamp assembled to a base, partly in section.
Figure 4:
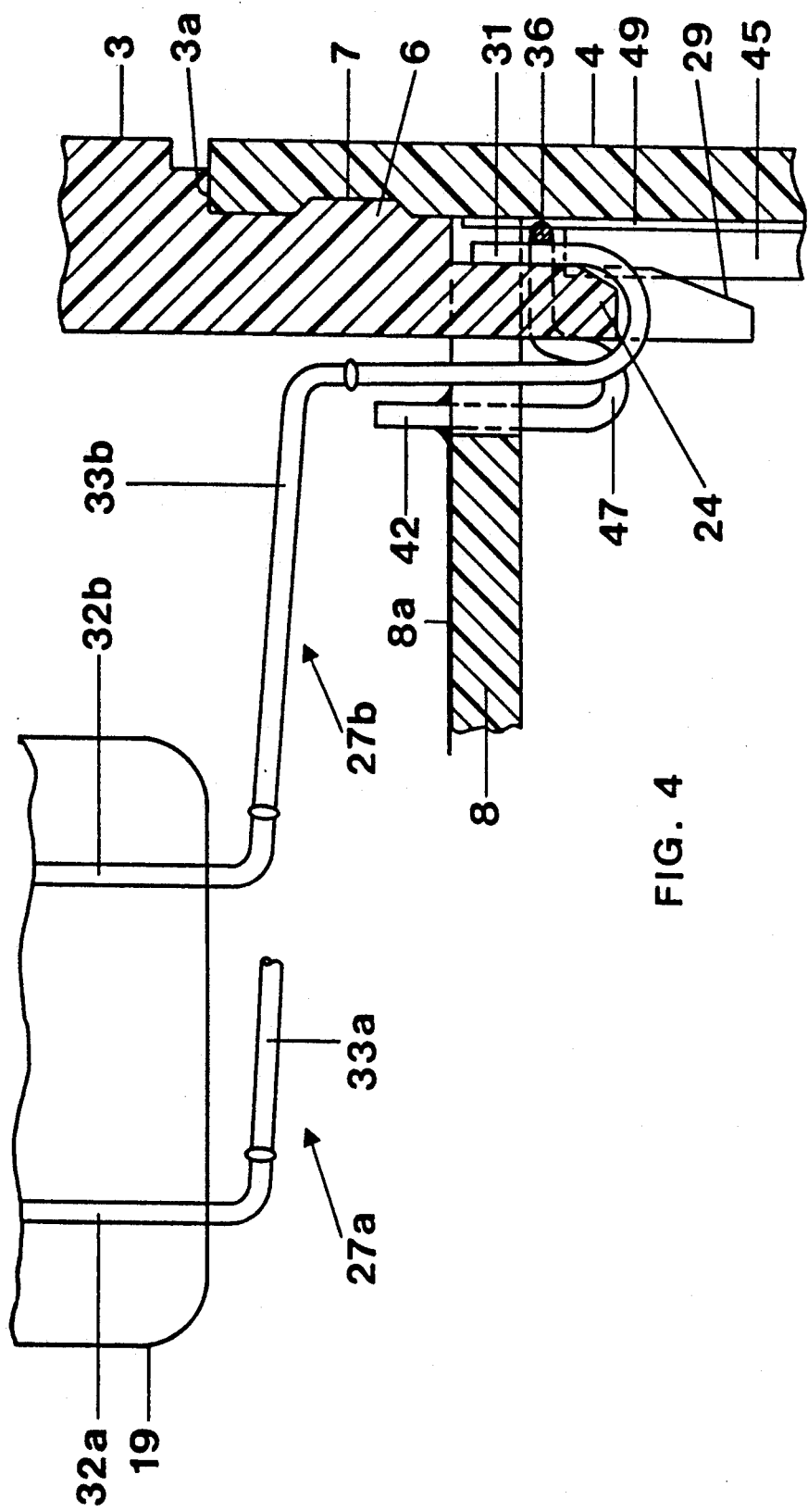
FIG. 4 is a fragmentary side view of the connection arrangement to a greatly enlarged scale.

Referring first to FIG. 1:

The lamp, essentially, has a discharge vessel 1, which is made up of four interconnected tubular elements, and a base 2. The base 2 has a cap portion 3 and a bottom portion 4, which forms a housing for a printed circuit board 8 and accessory elements 9. The housing 4 has a cylindrical region and an essentially frusto-conical region. The end of the conical region terminates in a cylindrical portion on which a base connection 5 in form of an Edison screw sleeve is secured, to have the shape of an E 27 base. The inner end of the housing 4 can be interengaged with the cap portion 3 by a snap-in connection. As best seen in FIG. 4 to an enlarged scale, the cap portion 3 is formed with an externally projecting bead 6 which engages within a groove 7 formed in the bottom portion 4. When the bottom portion 4 is pushed axially with respect to the cap portion 3, the bead 6 will engage in the groove 7 to form an essentially irremovable snap-in, interengaging coupling.

The printed circuit board 8 is arranged within the housing portion 4, extending at right angles to the longitudinal axis of the lamp. On the side facing the discharge vessel, it is formed with or has applied thereto printed circuits or similar conductive tracks 8a; circuit elements 9 forming an operating circuit of any suitable design for the lamp are located at the bottom of the printed circuit board 8, as schematically shown in FIG. 1, and electrically connected to the printed circuit conductive tracks 8a. Power connecting lines 10, 11 electrically connect the accessory circuit elements 9 on the circuit board 8 to the conductive portions of the base, that is, to the connecting sleeve 5 and a center bottom terminal button 12. Typically, the connecting line 11, with a fuse wire 13 interposed, is soldered to the button 12 on the base 2; the connecting line 10 is bent over in a slit formed in the bottom portion 4 of the base, to make an electrical and mechanically secure connection and contact with the sleeve 5. The connection of line 11 to the button 12 can be a solder connection.

Figure 2:
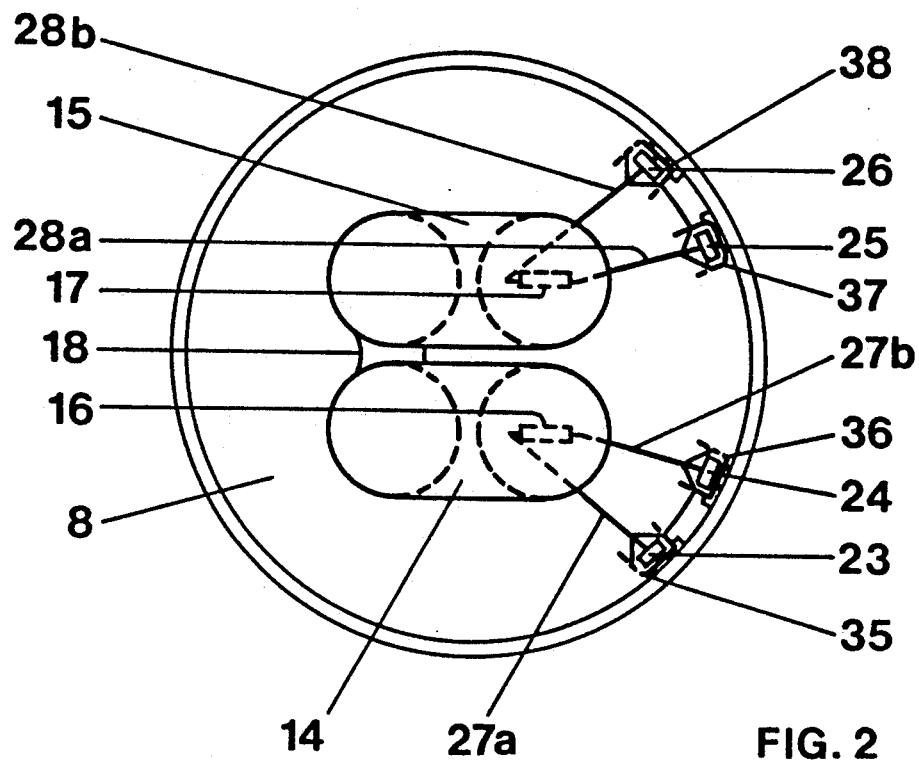
FIG. 2 is a top view of a four-tube compact fluorescent lamp and schematically illustrating the current supply leads and the connecting bows or arched elements.

The discharge vessel 1, as best seen in FIGS. 1 and 2, can be shaped as desired; in accordance with a preferred embodiment, it is formed of two U-bent tubular portions 14, 15, each one forming a light radiating tube. One leg of each of the U-shaped portions 14, 15, respectively, has an electrode 16, 17 positioned therein. The two other legs of the U-tubes are interconnected by a suitable interconnection schematically shown at 18. The free ends of the tubular elements 14, 15 are closed off by pinch seals 19, 20 to form gas-tight connections. The tubular elements are securely retained within the cap portion 3 by a cement 21. An exhaust tip 22 is connected to one of the tubular ends of the tube 14, that is, to that end which does not have an electrode therein. Cap 3 and bottom 4 are of insulating material.

The electrode connection leads 27a, 27b, 28a, 28b extending externally of the tubular elements 14, 15 must be supplied with electrical energy.

In accordance with a feature of the invention, the energy supplied to the connection leads 27a, 27b, 28a, 28b from suitable supply connectors or conductors 8a on the circuit board 8 is done this way:

The cap 3, adjacent its end portions, is formed with projections 23, 24, 25, 26, forming holding or support pins or stubs, best seen in FIG. 2. Since the holding and connecting arrangement for all the wires can be similar and, preferably, identical, only one of these holding and connecting arrangements will be described in detail, namely the holding and connection arrangement with reference to stub or projection 24.

Figure 3:
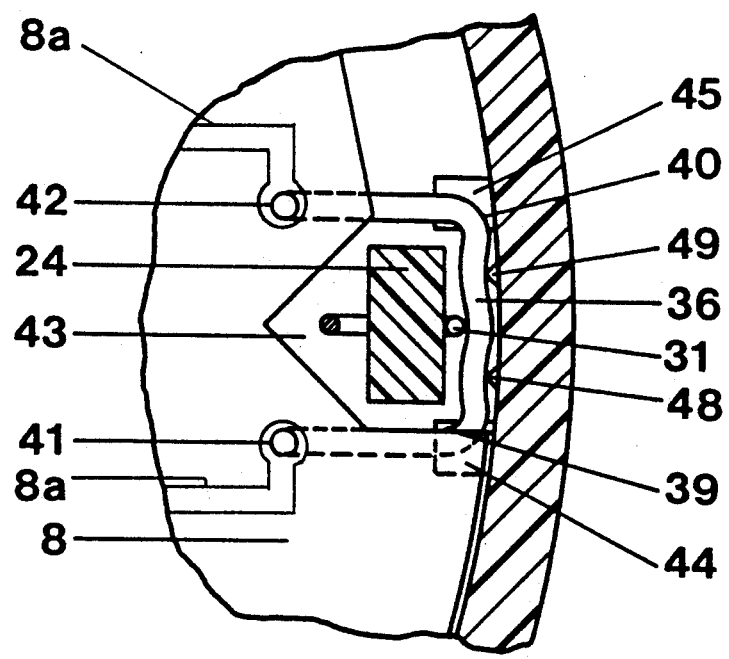
FIG. 3 is a fragmentary top view, partly in section, to a greatly enlarged scale of the connection arrangement.
Figure 5:
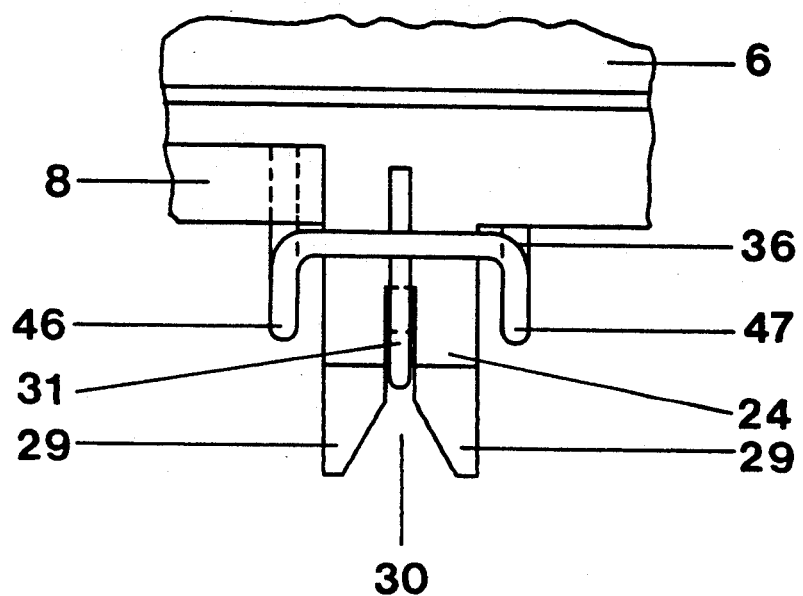
FIG. 5 is a front view of the holding projections with the ends of the discharge lamp current supply leads as well as showing the bow frame or arched elements, looking inwardly towards the central axis of the lamp.

The holding projections 23-26, as seen in FIGS. 3-5, are of essentially rectangular cross section. They have a width of about 3 mm, a thickness of 1.5 mm, and extend axially or longitudinally by about 6 mm. The free end of the holding projections 23-26 is formed with an inclined surface 29 (FIG. 4) and a notch 30 (FIG. 5). The ends of the current supply leads 27a, 27b and 28a, 28b are, as seen for the wire 31, guided to the inner, wider side of the projection, for example projection 24 (FIG. 4), then through the notch 30 and to the outer, wider side until the terminal end of the respective wire 31 (FIG. 4) reaches almost the end portion of the projection 24, that is, the region where it merges with the remainder of the cap portion 3. The wire 31, thus, extends first counter the insertion direction of the base portion 4 with the cap portion 3, and then around the notch 30 in the same direction as the insertion direction. The terminal ends of the current supplies 27a, 27b, 28a, 28b should be spaced from the inner ends of the projections 23-26 to provide a sufficiently long creep path from the wire to the junction 3a between the cap 3 and the base 4, and to inhibit any possible creep currents outside of the base 2.

The current supply connections, as illustrated for current supply line 27b, and partially 27a in FIG. 4, includes a wire 32a, 32b which extends from the respective pinch seal 19, which wire is made of Vacuvit (TM) wire. Butt-welded to the Vacuvit wire 32a, 32b is an intermediate wire of KPS, 33a, 33b. The diameter of the current supply leads 27a, 27b, 28a, 28b is about 0.4 mm.

The ends of the current supply leads, in the region of the holding projections, as well as the bow frame or arched elements 35, 36, 37, 38, to be described in detail below, are made of tinned wires of at least 4 micrometers thick tin coating. The tinning guarantees reliable and long-lasting electrical contacts, without oxidation. In the region of the pinch seals, the wires are made of Vacuvit (Trademark), which is an alloy of about 50% iron, 47% nickel and 3% chromium. This wire is particularly suitable for gas-tight melt connection or pinch sealing in electrical apparatus. Vacuvit wire, however, has the tendency to oxidize and, therefore, a direct connection of a Vacuvit wire with tinned wire may lead, over long periods of time, to lamp failure. A KPS wire 33b is butt-welded to the Vacuvit wire 32b and to the tinned wire 31, so that a piece of KPS wire, which is a steel wire with a copper jacket, is interposed. The wire 32a, 32b, thus, can be plain Vacuvit wire; the wire portion 33a, 33b is a copper-jacketed steel wire; and the wire portion 31 of the lead 27b (FIG. 4), is then made of a tinned wire.

The printed circuit board 8 is a flat element. It is supported on ribs 34 located in the bottom portion 4 (see FIG. 1) of the base 2. When the base 2 is assembled, the surface of the circuit board 8 carrying the conductive strips 8a will be positioned at the level of the projections 23 to 26 extending from the cap portion 3. The board 8, circumferentially, reaches almost to the inner wall of the bottom portion 4. It is formed with recesses or notches 43 in the region of the projections 23-26. Electrical connections and conductive strips 8a are also located in the region of the recesses, that is, in the circumferential areas of the printed circuit board 8.

In accordance with a feature of the invention, the electrical connection elements are secured to the printed circuit board 8, arranged for engagement with the conductors 27a, 27b, 28a, 28b from the discharge vessel.

In accordance with this feature of the invention, the electrical connection elements secured to the printed circuit board 8 are generally U-shaped wire elements 35, 36, 37, 38, that is, they form bows or bow frames or arched elements or clips having essentially right-angle corners 39, 40 (FIG. 3) terminating in essentially parallel legs, the ends 41, 42 of which are fitted from below—with respect to the base end 5—into the printed circuit board 8, and are soldered and otherwise suitably connected to the conductive tracks 8a, as best seen in FIG. 4. Both of the ends 41, 42, preferably, are soldered into suitable conductive elements on the printed circuit board at the side facing the discharge vessel 14. When the base 2 is assembled, the notches and recesses 43 prevent spurious electrical contacts between the ends 31 of the current supply leads 27a, 27b, 28a, 28b and any conductive strips or tracks 8a on the printed circuit board 8. The notch or recess 43 preferably is essentially triangular, as best seen in FIG. 3, and located between the connections of the ends 41, 42 of the bow frames 35–38. The essentially right-angle corners 39, 40 of the bows or arched elements 35–38 engage ribs 44, 45 which are secured in the inner wall of the base portion 4, extend parallel to the longitudinal axis of the inner wall, and have an essentially rectangular cross section. These ribs, for example, may have a height of 1 mm, thereby reliably supporting the bent-over corners of the bow or arched elements 35–38. The arched elements are resilient and provide for resilient engagement. To obtain increased resiliency, and as best seen in FIGS. 4 and 5 for the bow frame 36, the bow frames are formed with reentrant loops 46, 47. To obtain excellent contacting engagement and further enhance the resilient engagement force of the respective bow frame or arched elements 35–38 with the end portions 31 of the current supply leads 27a, 27b, 28a, 28b, respectively, internally extending projections 48, 49 having an essentially triangular cross section, with the apex of the triangle facing the bow frame, press the bow frame into tight engagement with the respective connecting wire end 31. The triangular engagement projections have a height of about 0.2 mm, and are secured to the inner wall of the base portion 4 of the housing 2, for example by being molded thereon.

The U-shaped bow frames or arched elements 35–38, just as the end portions 31 of the current supply leads, are made of tinned wire, in which the tin coating is at least 0.004 mm thick. A suitable diameter for the wires 35–38 and 31 is, for example, about 0.5 mm. These wires, for example, can be tinned copper wires.

The holding projections, such as projection 24, are made in the simplest form as molded-on projections forming extended portions near the edge or rim of the cap portion 3. They, simultaneously, locate and fix in position the respective current supply leads 27a . . . 28b, which can be placed into the triangular notch and wrapped around as best seen in FIG. 4. The ends of the current supply leads, thus, can be fitted around the holding projections and then extend in the insertion direction between the cap portion 3 and the base portion 4 upwardly along the holding projections, as best seen in FIG. 4. The wire 31 for example, may of course engage against the holding projections, FIG. 4 merely illustrating one possible path of the connecting lead 27b.

Preferably, all connecting wires are wire bails or wire elements; the connections from the printed circuit board are the U-shaped bow frames or arched elements 35–38. Right-angle corners 39, 40 ensure maintenance of the shape of the elements, even if slightly deformed by the triangular projections 48, 49 and engagement with the end portion 31 of the connecting conductor from the discharge vessel, as best seen in FIG. 3. The connecting end portions 41, 42 of the U-shaped clips or arched elements extend only slightly above the upper surface of the printed circuit board 8 and are soldered to tracks 8a. The right-angle corners are supported on the inner projections 44, 45 formed on the base portion 4 of the base 2, for example by being molded thereon. The reentrant loops with the bends 46, 47 (FIGS. 4, 5), forming a reentrant bend extending essentially perpendicularly to the plane of the printed circuit board 8, provide for additional resilient effect and resilient force in radial direction towards the inner wall of the housing or base portion 4.

To assemble the base portion 4 to the cap portion 3, the printed circuit board 8 together with the arched clips or arched elements 35–38 are first preassembled to the printed circuit board. The external conductors from the electrodes 27a . . . 28b are placed about the respective projections 23–26. The assembly is facilitated by the inclined portion 29 on the projections and the essentially dove-tailed notch 30 therein. To ensure that a sufficiently large space within the span of arched clips 35–38 is available for clearance, plate 8 is notched as seen at 43 in FIG. 3; other recesses may be used. The ribs 48, 49 and projections 44, 45 in the inner wall of the base portion 4 prevent deformation of the arched clip elements 35–38 upon assembly and deflection of the arched clip elements by the respective projections 23–26 extending from the cap portion 3. The respective ribs, thus, form guide ribs for the wire elements to be engaged. The essentially triangular projections 48, 49, projecting slightly inwardly of the base portion 4, ensure effective pressure of the respective bow frame or arched slip element 35–38 with the engaged conductor end 31 looped about the holding projections 23–26. Thus, substantial engagement force of mutually tinned engagement surfaces is provided.

Various changes and modifications may be made within the scope of the inventive concept.

I claim:

1. Compact fluorescent lamp having
   a discharge vessel (1);
   electrodes (16, 17) located in the discharge vessel;
   current supply leads (27a, 27b, 28a, 28b) extending from one end of the discharge vessel;
   a base (2) including a cap portion (3) and a bottom portion (4), and interfitting means (6, 7) for longitudinally, axially, telescopically joining the cap portion and the bottom portion;
   retention means (21) for securely retaining the discharge vessel in the cap portion (3) with the current supply leads extending into the cap portion;
   a circuit board (8) located in the bottom portion, extending transversely thereof, and circuit means (8a, 9) electrically and mechanically secured to the circuit board;
   a power connection means (5, 10, 11) secured to the bottom portion and electrically connected to the circuit means (8a, 9) on the circuit board, and
   an arrangement to electrically and mechanically securely connect the current supply leads (27a . . . 28b) to the circuit means (8a, 9) on the circuit board (8),
   said arrangement comprising
   holding projections (32, 24, 25, 26) secured to the cap portion, located adjacent the walls thereof, engaging end regions (31) of the current supply leads, and aligning the end regions of said current supply leads to extend in axial direction, at least in part along the holding projections; and bow, frame or arched elements or arched clip wires (35, 36, 37, 38) secured to said circuit board (8) and electrically connected to said circuit means (8a, 9), said bow, frame, or arched elemens or clip wires being located close to the lateral edges of the circuit board (8) and adjacent the inner walls of the bottom portion (4) in radial alignment with the holding projections and include engagement portions extending essentially parallel to the printed circuit board (8) to engage the end regions portions of the current supply leads and to clamp said end regions (31) into mutual intimate contact, said engagement portion and said end region being positioned between the wall of the bottom portion (4) of said base (2) and the respective holding projection upon axial joining of the cap portion (3) and the bottom portion (4) of the base, and to provide for electrical connection between the electrodes (16, 17) of the discharge vessel and the circuit means (8a, 9) of the circuit board (8).

2. The lamp of claim 1, wherein said holding projections (23-26) are formed as projecting extensions from located just inwardly of the edge or rim of the cap portion (3).

3. The lamp of claim 2, wherein said holding projections (23-26) have an essentially rectangular cross section.

4. The lamp of claim 1, wherein said holding projections (23-26) define free ends, and each of said free ends is formed with a notch (30).

5. The lamp of claim 4, wherein each of the current supply leads (27a . . . 28b) extending from the discharge vessel (1) are guided through the notch (30) of the respective holding projection (23-26) and then looped to fit against the outer wall of the respective holding projection.

6. The lamp of claim 1, wherein said holding projections (23-26) define free ends, and each of the free ends is formed with an inclined guide surface (29).

7. The lamp of claim 1, wherein the circuit board (8) is dimensioned to be slightly smaller than the inner dimension of the base portion (4).

8. The lamp of claim 1, wherein said bow, frame or arched elements or clip wires (35-38) are fitted into openings formed in the circuit board (8), and extend from the side of the circuit board facing said power connection means; and
    solder connections are provided electrically and mechanically securing the ends of the respective bow, frame or arched elements or clip wires to circuit tracks (8a) forming part of said circuit means (8a, 9) on the circuit board (8).

9. The lamp of claim 1, wherein said bow, frame or arched elements or clip wires (35-38), in top view, are of general U-shape with essentially right-angle corners (39, 40) joining the legs of the U to a cross portion thereof.

10. The lamp of claim 1, wherein, upon assembly of the base portion (4) to the cap portion (3), the holding projections (23-26), and end regions (31) of the current supply leads (27a . . . 28b) pass through the bow, frame or arched elements (35-38), the end regions (31) of the current supply elements engaging a central region of the respective bow, frame or arched element or clip wires, and forming part of said engagement portion.

11. The lamp of claim 1, wherein said bow frame or arched elements or clip wires (35-38) have an initial portion extending generally perpendicularly to the circuit board (8), then form a reentrant loop (46, 47) upwardly towards the circuit board (8), and then extend the engagement portion essentially parallel to the circuit board towards the inner wall of the bottom portion (4) of said base (2) and forming two essentially right-angle bends.

12. The lamp of claim 11, wherein the bottom portion (4) of the base (2) is formed with inner ribs (39, 40) supporting said engagement portion adjacent the essentially right-angle bends of the bow, frame or arched or clip elements (35-38).

13. The lamp of claim 9, wherein the circuit board (8) is formed with a recess (43) located between the free end portions of the bow frame or arched or clip elements (35-38).

14. The lamp of claim 1, wherein the bottom portion (4) is formed with axially extending inwardly projecting support and locating ribs (44, 45) molded integrally with the bottom portion.

15. The lamp of claim 9, wherein the essentially right-angle bends or corners (39, 40) of the bow frame or arched or clip elements (35-38) engage the inner wall of the bottom portion (4) of the base (2).

16. The lamp of claim 1, further including locating and support ribs (44, 45) having essentially rectangular cross section projecting inwardly from the bottom portion (4) of the base, and extending at least approximately parallel to the axis of the lamp.

17. The lamp of claim 16, wherein said bow, frame or arched elements or clip wires (35-38) are generally U-shaped and define two essentially right-angle bends or corners, a pair of legs, and a center region;
    and wherein said bends or corners (39, 40) engage on and are supported by the ends of said ribs (44, 45).

18. The lamp of claim 1, wherein said bow, frame or arched elements or clip wires (35-38) are generally U-shaped and define two leg portions and a center region between the leg portions;
    and wherein said bottom portion (4) of the base (2) is formed with inwardly extending engagement ribs (48, 49) of essentially triangular cross section bearing against said center region to provide a compression or clamping force between said center region and the end region (31) of the current supply leads (27a . . . 28b) extending essentially perpendicularly to said center region.

19. The lamp of claim 1, wherein at least the end regions (31) of the current supply leads (27a . . . 28b) comprise tinned wire having a tin coating of at least 0.004 mm thickness.

20. The lamp of claim 1, wherein said discharge vessel (14, 15) is closed off by pinch or press seals (19), said current supply leads (27a . . . 28b) extending through said pinch or press seals and including, at least in the region of the pinch or press seals, wire elements (32a, 32b) consisting essentially of 50% iron, 47% nickel and 3% chromium.

21. The lamp of claim 20, wherein at least the end regions (31) of the current supply leads (27a . . . 28b) comprise tinned wire having a tin coating of at least 0.004 mm thickness; and
    intermediate connecting elements (33a, 33b) interposed between said essentially iron, nickel and chromium wire and said end regions (31), said intermediate elements including steel wire with a copper jacket.

22. The lamp of claim 1, wherein said bow, frame or arched elements or clip wires (35-38) comprise tinned wire having a tin coating or layer of at least about 0.004 mm thickness.

23. A method of making a compact fluorescent lamp, as claimed in claim 1 comprising the steps of looping end regions (31) of said current supply leads (27a . . . 28b) about said holding projections (23-26) to form end portions extending essentially parallel to the holding projections and axially, in the direction towards the discharge vessel;

aligning the bow, frame or arched elements or clip wires (35-38) circumferentially, with said end regions (31) of said current supply leads; and mutually axially engaging the bottom portion (4) with the cap portion (3) and frictionally engaging a central region of said bow, frame or arched elements or clip wires with the end region (31) of the current supply leads while clamping or pinching said central region and end region between a respective holding projection and the inner wall of the bottom portion (4) of the base and thereby securely electrically and mechanically connect the current supply leads (27a . . . 28b) through said bow, frame or arched elements or clip wires (35-38) to the circuit means (8a, 9) on the circuit board.

24. The method of claim 23, wherein the bottom portion is formed with inwardly projecting rib means (48, 49), and said axially engaging step includes deforming the central region of said bow, frame or arched elements or clip wires (35-38) to enhance the engagement pressure thereof against the end region (31) of the respective current supply lead (27a . . . 28b).

* * * * *

UNITED STATES PATENT AND TRADEMARK OFFICE
CERTIFICATE OF CORRECTION

PATENT NO. : 5,289,079
DATED : February 22, 1994
INVENTOR(S) : WITTMANN

It is certified that error appears in the above-indentified patent and that said Letters Patent is hereby corrected as shown below:

Column 6:

line 39 (claim 1), before "Compact", insert --A-- line 44 (claim 1), after "(3)", insert --having walls and an edge or rim,-- line 45 (claim 1), after "(4)", insert --having inner walls and an inner dimension-- line 51 (claim 1), after "(8)", insert --having lateral edges,-- line 63 (claim 1), "32" should be --23--; after "26)", insert --having outer walls,--

Column 7:

line 1 (claim 1), after "bow", delete ","

line 2 (claim 1), after "38)", insert --having free end portions,-- line 4 (claim 1 after "bow and frame" delete","; change "elemens" to --elements-- line 14 (claim 1), before "wall", insert --inner-- line 42 (claim 7), "base" should --bottom-- line 49 (claim 8), after "bow" delete ","

UNITED STATES PATENT AND TRADEMARK OFFICE
CERTIFICATE OF CORRECTION

PATENT NO. : 5,289,079
DATED : February 22, 1994
INVENTOR(S) : WITTMANN

It is certified that error appears in the above-indentified patent and that said Letters Patent is hereby corrected as shown below:

Column 7:

line 53 (claim 9), after "bow" delete ","

line 55 (claim 9), after "right-angle", insert --bends or-- lines 61 and 64 (claim 10), after "bow" delete ","

line 62 (claim 10), after "elements", insert --or clip wires-- line 64 (claim 10), "element" should be --elements--

Column 8:

line 10 (claim 12), after "bow" delete "," ; after "arched", insert --elements-- line 11 (claim 12), change "elements" to --wires-- line 14 (claim 13), after "arched", insert --elements--; after "clip", change "elements" to --wires--

UNITED STATES PATENT AND TRADEMARK OFFICE
CERTIFICATE OF CORRECTION

PATENT NO. : 5,289,079
DATED : February 22, 1994
INVENTOR(S) : WITTMANN

It is certified that error appears in the above-indentified patent and that said Letters Patent is hereby corrected as shown below:

Column 8:

line 22 (claim 15), after "arched", insert --elements--; after "clip", change "elements" to --wires-- line 29 (claim 17) and line 35 (claim 18), after "bow" delete ","

Column 9:

line 10 and line 15 (claim 23), after "bow" delete ","

Column 10:

line 6 (claim 23), after "bow" delete ","

line 12 (claim 24), after "bow" delete ","

Signed and Sealed this

Eighteenth Day of March, 1997

Attest:

BRUCE LEHMAN

*Attesting Officer*     *Commissioner of Patents and Trademarks*